(12) United States Patent
Duggal et al.

(10) Patent No.: US 9,527,249 B1
(45) Date of Patent: Dec. 27, 2016

(54) NONWOVEN FLEXIBLE COMPOSITES

(71) Applicant: Air Cruisers Company, LLC, Wall Township, NJ (US)

(72) Inventors: Deepak Duggal, Avenel, NJ (US); Mark Jeffers, Rumson, NJ (US); Thomas W. Swierkocki, Manasquan, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 0 days.

(21) Appl. No.: 15/285,738

(22) Filed: Oct. 5, 2016

Related U.S. Application Data

(63) Continuation-in-part of application No. 15/058,688, filed on Mar. 2, 2016, now Pat. No. 9,481,144.

(60) Provisional application No. 62/126,898, filed on Mar. 2, 2015.

(51) Int. Cl.
| | |
|---|---|
| *B29C 70/16* | (2006.01) |
| *B32B 27/12* | (2006.01) |
| *B32B 5/02* | (2006.01) |
| *B63C 9/04* | (2006.01) |
| *B63C 9/125* | (2006.01) |
| *B63B 7/08* | (2006.01) |
| *B64D 25/14* | (2006.01) |

(52) U.S. Cl.
CPC ............... *B29C 70/16* (2013.01); *B32B 5/022* (2013.01); *B32B 27/12* (2013.01); *B63C 9/04* (2013.01); *B63C 9/1255* (2013.01); *B63B 7/08* (2013.01); *B63C 2009/042* (2013.01); *B64D 25/14* (2013.01)

(58) Field of Classification Search
CPC ........... B32B 27/12; B32B 5/022; B29C 70/16
See application file for complete search history.

(56) References Cited

U.S. PATENT DOCUMENTS

| | | | | |
|---|---|---|---|---|
| 4,094,028 A | * | 6/1978 | Fujiyama | .................... B01J 7/02 |
| | | | | 149/35 |
| 4,732,233 A | * | 3/1988 | Melander | ................. A62B 1/20 |
| | | | | 182/48 |
| 4,762,744 A | * | 8/1988 | Woiceshyn | ........... B29C 70/083 |
| | | | | 156/176 |
| 6,086,968 A | * | 7/2000 | Horovitz | .................... B32B 5/26 |
| | | | | 139/386 |
| 6,199,676 B1 | * | 3/2001 | Targiroff | ................ B64D 25/14 |
| | | | | 156/322 |
| 7,178,762 B2 | * | 2/2007 | Preston | ................... B32B 27/00 |
| | | | | 244/142 |
| 7,393,588 B1 | * | 7/2008 | Howland | .................. B32B 3/10 |
| | | | | 428/332 |
| 7,438,777 B2 | * | 10/2008 | Pourdeyhimi | ........... D04H 3/14 |
| | | | | 156/148 |
| 7,666,046 B2 | * | 2/2010 | Larochelle | ................ B63C 9/04 |
| | | | | 441/40 |

(Continued)

*Primary Examiner* — Thomas Randazzo
(74) *Attorney, Agent, or Firm* — Kilpatrick Townsend & Stockton LLP; Dean W. Russell; Kristin M. Crall

(57) ABSTRACT

Embodiments of the present invention provide systems and methods for using nonwoven materials for evacuation slides, life rafts, life vests, and other life-saving inflatable devices. The nonwoven materials have a substrate layer with continuous filaments formed in various directions. The substrate layer then has a layer (e.g., a coating or a film or both) on one or both surfaces of the substrate of nonwoven material.

27 Claims, 6 Drawing Sheets

(56) References Cited

U.S. PATENT DOCUMENTS

| | | | | |
|---|---|---|---|---|
| 7,786,028 B2* | 8/2010 | Souther | ............... | B32B 5/022 |
| | | | | 428/373 |
| 9,114,570 B2* | 8/2015 | Downs | ............... | A43B 23/0225 |
| 9,376,180 B2* | 6/2016 | Swierkocki | ............... | B63C 9/04 |
| 2006/0029759 A1* | 2/2006 | Hannigan | ............... | B64D 25/14 |
| | | | | 428/36.1 |
| 2006/0121805 A1* | 6/2006 | Krulic | ............... | B32B 5/022 |
| | | | | 442/20 |
| 2007/0141282 A1* | 6/2007 | Chang | ............... | A43B 13/20 |
| | | | | 428/35.2 |
| 2010/0032081 A1* | 2/2010 | Green | ............... | B29C 47/0014 |
| | | | | 156/219 |
| 2012/0186433 A1* | 7/2012 | Braiewa | ............... | B32B 5/18 |
| | | | | 89/36.02 |
| 2012/0276798 A1* | 11/2012 | Chai | ............... | B32B 27/12 |
| | | | | 442/394 |
| 2013/0224428 A1* | 8/2013 | Clerici | ............... | B32B 5/26 |
| | | | | 428/114 |
| 2015/0126085 A1* | 5/2015 | Swierkocki | ............... | B63C 9/04 |
| | | | | 441/41 |
| 2016/0031164 A1* | 2/2016 | Downs | ............... | A43B 7/12 |
| | | | | 428/12 |

\* cited by examiner

NONWOVEN FLEXIBLE COMPOSITES

CROSS REFERENCE TO RELATED APPLICATIONS

This application is a continuation-in-part of U.S. Ser. No. 15/058,688 filed Mar. 2, 2016 titled "Nonwoven Flexible Composites," which application claims the benefit of U.S. Provisional Application Ser. No. 62/126,898, filed Mar. 2, 2015, titled "Nonwoven Airholding Fabrics," the entire contents of which are hereby incorporated by reference.

FIELD OF THE DISCLOSURE

Embodiments of the present disclosure relate generally to nonwoven flexible composites that find particular use in connection with evacuation slides, rafts, life vests, or other emergency flotation devices. Such devices are typically formed from woven substrates, but the present inventors have determined that using nonwoven substrates in connection with such devices can provide improved benefits.

BACKGROUND

Federal aviation safety regulations require aircraft to provide evacuation and other safety provisions for passengers. These include evacuation slides, life rafts, life vests, and other life-saving inflatable devices. For example, inflatable escape slides and life rafts are generally built from an assembly of inflatable tubular structures that form airbeams that are sealed to one another. Inflatable escape slides and life rafts also have non-airholding features, such as patches, floors, sliding surfaces, gifts, handles, and other features. A balance between strength and weight must be reached during the design process. The material must be appropriately flame resistant, have appropriate friction to allow passenger sliding, have sufficient strength to withstand high inflation forces, resist tearing and abrasion, but also be light enough so as to not unduly add to aircraft weight.

Evacuation slides, life rafts, life vests, or other life-saving inflatable devices and their accompanying accessories and components are inflatables typically formed from woven base substrates. A woven base substrate is typically coated and/or laminated in order to give it the desired air holding characteristics. As background, woven fabric constructions are characterized by two sets of yarns: warp and weft yarns. Warp yarns are raised and lowered to make "sheds," and weft yarns are passed through these sheds, perpendicular to the warp yarns (and may be referred to as fill or pick yarns). The woven substrates give strength and rigidity for inflatable tubular structures.

However, such a woven architecture introduces a "crimp effect" or undulations in the yarns as they pass alternately over and under one another during the weaving process. Yarn "crimp" is the waviness of warp yarns and weft yarn interlacing together to produce the fabric construction. It is affected by yarn count, fabric structure, and weaving tensions related to the strength of the textile fabric. If a load is applied on a woven fabric and the yarns are not crimped, the full load will be faced in tension at complete strength. However, if the yarns are bent or crimped, the initial load will be consumed in straightening the bent yarns, and then take upload. The use of woven construction can thus lead to "low strength materials." The crimp effect can also influence fiber volume fraction, which eventually leads to compromised mechanical performance of this fabric. Specific features that may be compromised are tensile and compressive properties.

When woven fabrics are used for inflatable structures, and particularly when used to create inflatable tubular structures that are cylindrical in shape, the inflatable structure experiences load in three directions. First, there is a circumferential stress or hoop stress, which is a normal stress in the tangential direction. Second, there is an axial stress, a normal stress parallel to the axis of cylindrical symmetry. Third, there is a radial stress, a stress in directions coplanar with, but perpendicular to, the symmetry axis. Thin sections of inflatable fabric will generally have negligible radial stress. However, the hoop stress is generally two times the axial/longitudinal stress. The practical effect of this is that an inflatable tube, such as an evacuation slide or life raft tube, experiences two times more stress in the hoop direction compared to the length direction. Examples of these two stresses and how they are experienced along a tubular structure is illustrated by FIG. 3. However, current woven substrates used for inflatable tubular structures are constructed with yarns having the same or similar strength in both the hoop and the axial/longitudinal direction. This can add to unnecessary and undesirable weight to the overall structure.

Another challenge that can be presented by the use of woven substrates occurs during coating of the substrates. Empty voids 10 in between the yarns 12 can create high and low points that pose challenges during the coating process. This is generally referred to as the peak-valley effect, and is illustrated by FIG. 1. In order to make these fabrics "air holding" or having "gas barrier" properties, multiple layers of coatings 14 are put on top of one another until the desirable thicknesses are achieved. A final top coating 16 may be applied for rendering air holding features. These multiple layers of coatings 14 are undesirable, as it increases weight and cost of such fabrics. Improvements to fabrics used for inflatables are thus desirable.

Nonwoven fabric is a material made from fibers that are bonded together by chemical, mechanical, heat or solvent treatment. The term is generally used in the textile manufacturing industry to refer to fabric-like materials that are neither woven nor knitted. The use of nonwoven materials has generally been limited to the medical industry (for surgical gowns and drapes), the filter industry (for various types of filtration, including coffee and tea bags, vacuum bags, and so forth), the geotextile industry (for foundation stabilizers, erosion control materials, sand and landfill liners), and other miscellaneous industries (such as for carpet backing, for diapers or feminine hygiene products, cleaning wipes, for marine sails, for parachutes, for backpacks or as batting in quilts or comforters). Nonwoven materials have not, however, been used in connection with inflatable life-saving devices as described herein. Use of nonwoven materials for these uses presents unique challenges that the present inventors have solved.

BRIEF SUMMARY

Embodiments of the invention described herein thus provide systems and methods for using nonwoven materials for evacuation slides, life rafts, life vests, and other life-saving inflatable devices. The nonwoven materials described may also be used for non-airholding accessories or components of these devices, such as sliding surfaces of an evacuation slide, girts, handles, raft floors, patches, or any other feature. For instance, in other examples, there may be provided a non-airholding feature on an evacuation slide, life raft, life vest or other life-saving inflatable device, the non-airholding feature comprising: a flexible composite material, comprising a substrate of nonwoven material comprising a plurality of filaments; an adhesive or primer to bind the filaments; and a coating or film or both on one or both surfaces of the substrate of nonwoven material; wherein the flexible composite material is a high-strength lightweight material with a tensile strength of at least about 100 pounds per inch and a weight of about 8 ounces per square yard or less, wherein the flexible composite material is adhered to the emergency device.

The nonwoven materials have a substrate layer with filaments laid down in various directions. The substrate layer is then coated and/or applied on one or both sides as a coating or film. A coating may be in a liquid form and applied to the material. The coating may be any of the adhesives, primers, resins, or other materials described herein. The film may be a layer or solid (non-liquid) sheet that is applied to the material. A film may be provided over a coating in some instances. The coating or film or both a coating and a film together may be collectively referred to herein as a "layer." The layer may be applied in order to render the material as having air-holding characteristics, such that it provides a gas barrier for the material. In other examples, the layer may be applied to give the material a certain finish or feel, such as a slick sliding surface, a rough life raft floor, or any other desired feature or finish such as improving seam adhesion or abrasion resistance. The layer can provide protection against abrasion and also gives higher adhesion. In one example, the layer is a polymer. In one example, the layer may be polyurethane. In other examples, the layer may be polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), or any combination thereof. Other potential layers that form a layer are possible and considered within the scope of this disclosure.

Adhesives or primers may be particularly useful in cross-linking the materials/filaments to one another. This may result in high filament to adhesive adhesion, high filament to filament adhesion, high adhesive to coating adhesion, high adhesive to lamination film adhesion, high filament to coating adhesion, high filament to lamination film adhesion, or combinations thereof. Exemplary adhesives or primers include but are not limited to crosslinked polyurethanes that are solvent based or water based. Other polymers that can be used as primers are listed above.

In one example, there is provide an inflatable evacuation slide, life raft, life vest, or other life-saving inflatable device, comprising: a flexible composite material, comprising a substrate of nonwoven material comprising a plurality of filaments; an adhesive or primer to bind the filaments; and a layer of a gas barrier polymer on one or both surfaces of the substrate of nonwoven material; wherein the flexible composite material is a high-strength lightweight material with a tensile strength of at least about 100 pounds per inch and a weight of about 8 ounces per square yard or less, wherein the flexible composite material is adhered to itself to form a tubular structure or is adhered to another material.

In some examples, the substrate of nonwoven material comprises multiple layers. The gas barrier polymer can be a coating or a film or both. The specific gas barrier polymer used may be polyurethane, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), or any combination thereof. The gas barrier polymer layer can have a thickness between about 0.5 mil to about 2 mil.

In some examples, the substrate of nonwoven material comprises a non-inflatable part of the device. For example, it may form floor material of a life raft or an evacuation slide, a girt material of an evacuation slide, or a handle or accessory patch of a life raft or evacuation slide.

The filaments of the nonwoven material may be non-continuous or continuous in length. The filaments of the nonwoven material may be unidirectional or multidirectional. They may be in a random orientation filament layout or other random orientation. They may be one or more single strands positioned according to load exhibited on the structure. There may be one or more additional strands positioned on top of the one or more single strands. The substrate of nonwoven material may be a customized fabric comprising filaments laid in particular directions of the expected stress to be experienced by the device to be manufactured. The device may be a tubular structure comprising a hoop direction and a longitudinal direction, wherein there are more filaments in the hoop direction than in the longitudinal direction. If the device has one or more miter seam locations, there can be more filaments at the miter seam location than at other areas of the device. The device can include tubular structures of varying diameters, wherein structures comprising larger diameters comprise more nonwoven filaments than structures comprising smaller diameters.

Examples also relate to a method for manufacturing an inflatable evacuation slide, raft, life vest, or other life-saving inflatable device, comprising: providing or obtaining a flexible composite material, comprising a substrate of nonwoven material; applying a first layer on at least one surface of the substrate of nonwoven material; forming the material into a tubular structure; and applying a floor or other accessory to the tubular structure.

DETAILED DESCRIPTION

Embodiments of the present invention provide substrates of flexible composite materials 20 that have minimal to zero "crimp effect." This may generally be referred to as "low crimp," and this term is used to refer to materials that do not have fibers or filaments that are wound or otherwise woven together. The materials may find particular use in connection with life-saving inflatable devices, but their uses are not intended to be limiting thereto. Examples include evacuation slides, life rafts, life-saving vests, inflatable shelters, or combinations thereof. The materials described may be used to form air-holding portions of these devices, but they may also be used to form other portions of the devices, such as the floor of a life raft, floor of an evacuation slide, girt of an evacuation slide, handle of an evacuation slide, and so forth.

Figure 1:
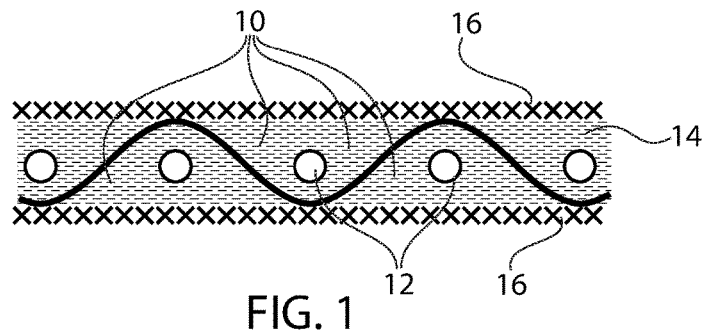
FIG. 1 shows a side schematic view of a woven prior art material.

Straight, non (or low)-crimp filaments and/or yarns exhibit full load in tension at complete strength. A flat, non-woven fabric 20 made of straight filaments 22 laid in certain orientations can present a flat surface without the above described peak-valley effect, experienced by woven fabrics. It has been found that flat surfaces can also be nonporous, at least to a certain degree. This can lead to a thinner layer required. (This is generally because with a woven fabric, the coating 14 needs to fill the holes created by peaks and valleys. as shown by FIG. 1. With a flat, nonwoven fabric 20, as illustrated by FIG. 2, these peaks and valleys are not present.)

Figures 2A, 2B:
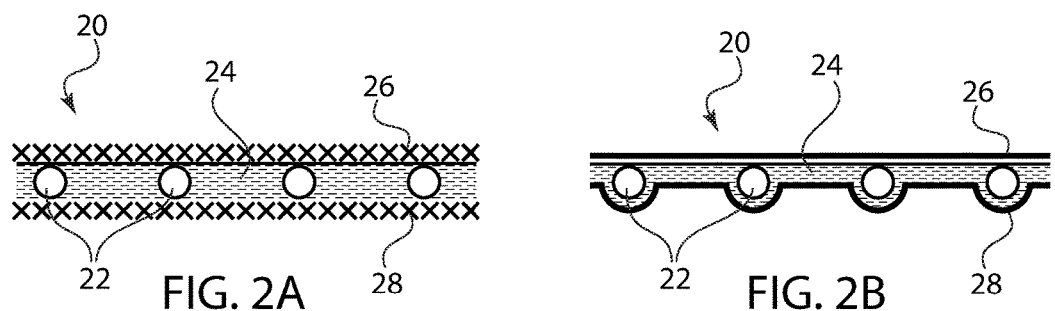
FIG. 2A shows a side schematic view of a nonwoven material, having filaments embedded in an adhesive matrix coated with a layer on both sides.
FIG. 2B shows a side schematic view of a nonwoven material, having filaments embedded in an adhesive matrix and laminated with a layer on both sides.

FIG. 2A shows straight laid filaments 22 in an adhesive 24. This configuration also has a first layer 26 and a second layer 28 on either side of the nonwoven substrate. FIG. 2B shows straight laid filaments 22 in an adhesive 24. This configuration also has a coating or film or both layer 26 and a coating or film or both layer 28 on either side of the nonwoven substrate. More detail about the particular materials that may be used are provided further herein.

Additionally, nonwoven substrates can be stronger than traditionally used woven substrates. This can similarly lead to a thinner layer required to make such substrates air-holding. The present inventors have found that the examples described herein can use about 50% less material, which can lead to a finished material that is consequently about 50% lighter. Utilizing nonwoven flat substrates can thus reduce the layer weight significantly as compared to woven substrates. In fact, in some examples, minimal to no layer may be required.

Although the embodiments described herein focus on life saving inflatables, such as evacuation slides, evacuation slide/rafts, life rafts, emergency floats, emergency flotation systems, and life preservers, it should be understood that the disclosure is equally applicable to other fabric-like devices, including but not limited to inflatable/non-inflatable decontamination shelters, inflatable/non-inflatable shelters, inflatable/non-inflatable military shelters, ship decoys, inflatable military targets, and space inflatable applications.

The nonwoven materials used in this disclosure may include any number of materials. Examples include staple fibers or filaments, which may include cotton or other natural materials. Other examples include filament fibers, which include synthetic materials. One type of nonwoven material that may be used in connection with this disclosure is a nonwoven material that is a laminated mix of carbon and polymer filaments. In one example, the material is a reinforced laminate formed from one or more unidirectional-tapes (also called uni-tapes) laminated to a polymer film. The filament or monofilament material may be carbon and extended chain polyethylene or liquid crystal polymers embedded in a polymer matrix. The material may be an inorganic silicon. The material may be a monofilament aramid. The material may be nylon. The material may be polyester. The material may be cotton. The material may be ultra high molecular weight polyethylene (UHMWPE) filaments. The material may incorporate boron and/or ceramics. The material may be a material that has typically been used for sailcloth and/or for kites. The material may be combinations of any of the above options. Additional examples are described by U.S. Pat. No. 5,333,568, all of which are considered usable herein. Other materials are possible and considered within the scope of this application. The type of filaments used may be optimized depending upon the particular device to be manufactured. In some examples, the filaments used may have diameters of up to about five times less than conventional strands or threads used for woven materials. Additionally, because of the added strength possible due to configurations of this disclosure, the nonwoven fabric may be about ⅓ of the thickness of a traditional woven fabric used for inflatables.

Because the final materials described herein are designed for use in connection with inflatable structures that must withstand high inflation pressures, the materials used must be designed to withstand such pressures. As background, current slide, life raft, and life vest fabrics must meet FAA requirements listed under appropriate technical standard order (TSO). The TSO prescribes the minimum performance standards (MPS) that these emergency evacuation products must meet. Current woven inflatable air-holding fabrics have average finished fabric weights of approximately 8.0 oz/sq yard. (A typical breakdown is that 50% (4.0 oz/sq yard) is the substrate weight and 50% (4.0 oz/sq yard) is the coating and/or lamination film weight.) These inflatable fabrics must also meet a minimum tensile strength of 190 lbs/inch (for slides and life rafts) and 210 lbs/inch (for life vests). These are current requirements set by regulatory authorities, such as the FAA. However, it is believed that the present concepts may also find use on materials that have a tensile strength of 100 lbs/inch, 120 lbs/inch, 130 lbs/inch, 140 lbs/inch, 150 lbs/inch, 160 lbs/inch, 170 lbs/inch, 180 lbs/inch, or any integers there between.

Typically, many pieces of fabric (panels) are joined together to form tubular structures. The strength requirement is thus not limited only to the body fabric (the field of the inflatable tube), but is also required on seam areas. In order to keep the gas inside the tubes for long durations, the seams must be sealed together (via thermal welding or adhesive bonding methods) to make them leak proof. Such seams must meet minimum shear strengths of 175 lbs/inch (at room temperature) and 40 lbs/inch (at elevated temperature of 140° F.). Such seams must have a peel strength of 5 lbs/inch (slides and life rafts) and 10 lbs/inch (life vests). The requirements outlined herein are current requirements; it should be understood that the materials described by this disclosure may have various features modified in order to meet other requirements that may be set in the future or by different regulatory authorities. Safety product inflatables also need to comply with a high pressure test (also called overpressure test) requirement, in which the device must withstand high inflation pressures without causing any damage to the integrity of the seams. For example, slides are required to withstand two times the maximum operating pressure without failure for at least one minute. Depending upon the tube diameter and maximum operating pressure established for that slide, the hoop stress/load/force (which is the larger of the two stresses experienced by the seams) can vary. For example; a 24" diameter tube with 3.5 psi maximum operating pressure would experience hoop stress of about 84 lbs/inch.

As discussed above, existing nonwoven fabrics available on the market and described by prior art literature are primarily used for low cost commodity items, such as filters, hospital gowns, hygiene products, and so forth. These fabrics are low cost materials, where the necessary and achieved strength is nowhere near the strength required on inflatable products for safety applications, which experience large pressure loads. Existing inflatable nonwoven materials do not meet any of the above-listed TSO strength requirements at desirable weights. This means that in order to reach the desired strength, the materials would need to be so heavy that they would be unworkable for being stored on board a vehicle where reduced weight is a major concern. By contrast, at the desired low weights, currently-available nonwoven materials would not have the required strength. Accordingly, the present inventors have specified nonwoven materials having strengths that allow them to be used in the safety inflatable applications described herein, while also having the desired low weights.

The nonwoven substrates used are thus highly engineered nonwoven substrates made with specialized engineered filaments and polymeric layers to achieve the highest strength to weight ratio on inflatable air-holding fabrics for life-saving inflatable devices. In specific examples, the materials achieve a fabric tensile strength of up to or more than about 190 lbs/inch for slides and life rafts and about 210 lbs/inch for life vests. In other examples, the materials achieve a fabric tensile strength of up to about 100 lbs/inch. In other examples, the materials achieve a fabric tensile strength of up to about 120 lbs/inch. In other examples, the materials achieve a fabric tensile strength of up to about 130 lbs/inch. In other examples, the materials achieve a fabric tensile strength of up to about 140 lbs/inch. In other examples, the materials achieve a fabric tensile strength of up to about 150 lbs/inch. In other examples, the materials achieve a fabric tensile strength of up to about 160 lbs/inch. In other examples, the materials achieve a fabric tensile strength of up to about 170 lbs/inch. In other examples, the materials achieve a fabric tensile strength of up to about 180 lbs/inch. In specific examples, the materials achieve a shear strength of up to or more than about 175 lbs/inch (at room temperature) and 40 lbs/inch (at 140° F.). In specific examples, the materials achieve a seam peel strength of up to or more than about 5 lbs/inch (slides and life rafts) and 10 lbs/inch (life vests). In specific examples, the materials can withstand TSO overpressure requirements of 2 times the maximum operating pressure.

Even when nonwoven materials are used for air mattresses, the materials are not manufactured or designed to withstand the type of inflation pressures described herein. The focus of those materials is to be low cost. Accordingly, nonwoven air mattress materials are generally made of short random fibers that do not have a high strength. Using inflation pressures required by aircraft regulations on camping air mattresses would cause the low cost air mattresses to split. For perspective, these air mattresses have a tensile strength of about 100 pounds per inch or less, a weight of about 16 ounces per square yard or greater, and a burst strength of less than about 5 psi. They are also not designed to work in extreme temperature conditions (such as −40° F. up to 160° F.).

Exemplary test data provides that in contrast to the current state of the woven coated fabrics, which have low strengths and high weights, using the technologies described herein, it is possible to provide an inflatable structure with a strength to weight ratio of about 190/4=47.5. By contrast, woven composites generally have a strength to weight ratio (minimum) of about 190/8=23.75. Other nonwoven strength to weight examples include but are not limited to 190/7, 190/6, 190/5, 190/4, 190/3 and 190/2 or any permutations of fractions thereof (These examples provide a tensile strength of 190 pounds per inch and weights of about 2 to about 7 ounces per square yard.)

In addition to laying down filaments on an adhesive substrate or a paper, it is also possible to manufacture the flexible nonwoven composite as a web using other technologies. The nonwoven materials described may be manufactured in any number of ways. They may be manufactured using mechanical means, heat means, water means, or combinations thereof. Some specific examples of ways that the non-wovens used in this disclosure and accompanying claims may be manufactured include, but are not limited to, felting, adhesive bonding, spin laying, carding, spun bonding, wet-laid filaments, stitching or stitch bonding, needling or needle punching, calendaring, hydro entanglement using high jet pressures, and/or hot air bonding or thermal bonding. The filaments of fibers may be manufactured by spun bonding, wet bonding, dry bonding, or any other appropriate methods.

As illustrated by FIG. 2A, the monofilaments 22 can be uniformly embedded in an adhesive matrix using an elastomeric polymer matrix or bonding adhesive 24. In other examples, the filaments can be pre-coated to become "sticky filaments" that can be laid on a paper substrate. The paper can be peeled away, and the resulting filament can be sandwiched by layers of a polymer film. Laying down filaments in this way, as opposed to weaving the filaments, can help address the above-described problems created by woven products. Instead, this solution provides a flat substrate. The substrates may form a reinforcing material that is positioned between upper and lower layers of a polymer layer. As described in more detail below, it is possible to lay down filaments in varying configurations in order to provide an engineered filament placement for the desired use. The filaments may be continuous or non-continuous filaments or any combination thereof. The filaments may all have the same diameter or filaments of varying diameters may be used. The layer of monofilaments can be a single layer or multiple layers.

When nonwoven materials are used for sailcloth and kites, the polymer film of the above-described configuration used is generally Mylar. The filaments are laid down into a resin and a top and bottom layer of Mylar is positioned on either side of the filaments. The material is autoclaved so that heat and pressure can fuse and cure individual components together.

The present inventors have found, however, that the use of Mylar as the polymer film is not optimal for securing to or otherwise working with the adhesives used to manufacture life-saving inflatable devices. Mylar being a low surface energy substrate, does not adhere well to filaments, coatings and/or films even when assisted with cross-linking adhesives, thereby causing delamination and peeling of the filaments from the coating and/or film when put under the prescribed load of an inflatable safety product. Instead, the materials of the present disclosure use a polyurethane layer 26, 28 on one or both sides of the nonwoven base substrate/structure. Other examples of layers include but are not limited to polyvinylidene chloride (PVDC), polyvinyl alcohol (PVOH), ethylene vinyl alcohol (EVOH), Polyethylene Terephthalate (PET), Polyethylene (PE), Polyamides, Polypropylene (PP), Polylactic acid (PLA), or any other appropriate polymer, or combinations thereof. FIGS. 2A and 2B provide schematics illustrating a configuration with a layer on both sides of the substrate. It should be understood that it is also possible for the layer to be applied to only a single side or surface of the substrate. It was unexpectedly found that by replacing the Mylar film with a polyurethane (or other) layer, the nonwoven material functions optimally for the life-saving inflatable devices described herein.

Polyurethanes are formed by the reaction of two components: an isocyanate component and a polyol component. Polyurethanes are generally high molecular weight polymers with a broad range of properties due to a wide range of formulation variables. Exemplary variations and types of polyurethane that may be used in connection with this disclosure include, but are not limited to:

aromatic or aliphatic polyurethanes;

thermoplastic polyurethanes (TPU) (thermoplastic urethanes are polymers that can be melted and reformed; they are elastic and highly flexible) thermoset based polyurethanes (a thermoset urethane is a polymer that cannot be melted and reformed and is generally more durable than thermoplastic urethanes);

polyester TPUs, which have high resistance to oils and chemicals and provide excellent abrasion resistance;

polyether TPUs, which are slightly lower in specific gravity than polyester and polycaprolactone grades and offer low temperature flexibility, good abrasion and tear resilience, are durable against microbial attack, and provide good hydrolysis resistance, making them suitable for applications where water is a consideration; and polycaprolactone TPUs, which have the inherent toughness and resistance of polyester-based TPUs combined with low-temperature performance and a relatively high resistance to hydrolysis.

Additionally, the adhesives/resins, coatings and films that are to be used on the nonwoven flexible composites described herein need not be limited to polyurethane material. Other exemplary polymeric layers that can be used in place or in conjunction with polyurethanes include, but are not limited to, polyvinylidene chloride (PVDC), polyvinyl alcohol (PVOH), ethylene vinyl alcohol (EVOH), Polyethylene Terephthalate (PET), Polyethylene (PE), Polyamides, Polypropylene (PP), Polylactic acid (PLA), or any other appropriate polymer, or combinations thereof.

In one example, the layer may have a thickness of about 0.5 mil to about 5 mil. In another example, the layer may have a thickness of about 0.5 mil to about 2 mil. In another example, the polyurethane layer may have a thickness of about 1 mil.

It is also possible to apply adhesive on the filaments during manufacture, in addition to their being mounted on a film. This may assist further with adhesion of the material to itself or to other material portions for manufacture of the desired shapes.

Additionally, the adhesives used by the present assignee are believed to bond with the polyurethane layer in order to cause the material to become an integral, one-piece, or otherwise monolithic, single construction of material that is cross-linked and that will not delaminate from itself. One exemplary adhesive that has found success is an isocyanate-based adhesive. Other adhesives that may be used include, but are not limited to, those listed above.

If the filaments are additionally coated with an adhesive (in addition to or instead of a polyurethane or other adhesive), this may further help the bonding/cross-linking described. For example, using an isocyanate-based adhesive with a polyurethane film that is coated or laminated onto the filament substrate can provide a strengthened material specifically designed for high stress uses. The isocyanate-based adhesive may be added during formation of the substrate; isocyanate-based adhesive may be used as an adhesive on the outside of the material; and/or an isocyanate-based adhesive primer may be used. If the material is welded and a specific adhesive is not used, it is possible to incorporate isocyanate-based adhesive during the formation of substrate adhesive and/or apply an isocyanate-based adhesive primer on the seams to be welded.

Filament orientations can play a significant role in determining tensile, tear, and puncture properties of fabrics. In one example, it is possible to provide areas of the material that are loaded with more filaments than at other areas of the material. Embodiments of this disclosure provide varying filament orientations that can include different filament thicknesses and/or filament densities at mitered joints or seams, at diameter changes (tapering of fabrics) and/or at hoop stress versus length locations.

Figure 3:
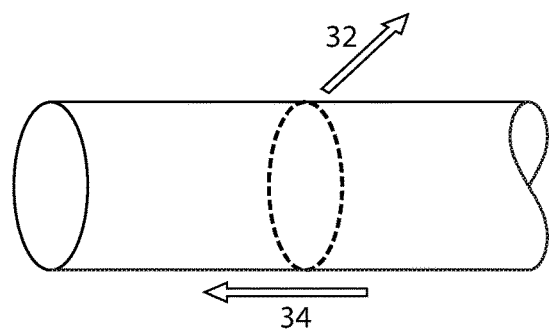
FIG. 3 shows a side schematic view illustrating various stresses experienced by an inflatable tubular element.

For example, referring now to the orientation of the flexible composites panels/substrates formed for evacuation slides, a relatively high load is generated by the air pressure used to inflate the tubes that form the airbeams. Alternatively, high pressures are also experienced by life raft floors, evacuation sliding surfaces, handles, and other accessories or non-airholding features on the devices. These high loads also need to be maintained in order to preserve structural rigidity under the weight of the slide and under the weight of passengers during use. The loads across the diameter of a tube (in the hoop direction 32) are generally larger than the loads in the length or longitudinal direction 34 of the tube. This is illustrated schematically by FIG. 3. Because the tubes that form the air beams on an evacuation slide do not experience balanced loads, it is possible to design the fabric to be manufactured to be stronger in one direction as opposed to another direction. Accordingly, various engineered filament orientations are also described herein. The engineered filament orientations may provide enhanced strength at certain areas where the inflatable lifesaving structures typically experience high stresses. For example, it may be possible to provide more filaments or reinforced filament areas on the tube where higher stresses will be experienced. These filaments may be in the same or different directions.

Figure 4:
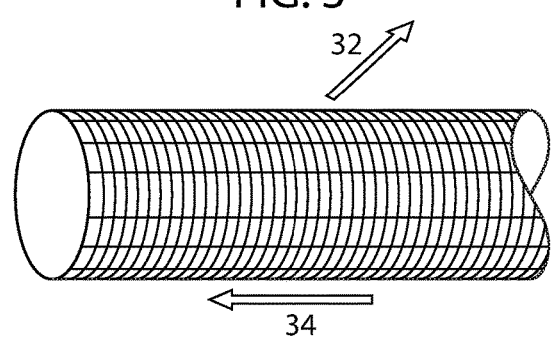
FIG. 4 shows a side schematic view of one potential filament placement along a tubular element.

For example, as illustrated by FIG. 4, it is possible to provide two times as many filaments 22 in the hoop direction 32 as in the axial/longitudinal direction 34. In other examples, it is possible to provide 1.5 times as many filaments, three times as many filaments, four times as many filaments, or any other desired strength parameters.

Figure 5:
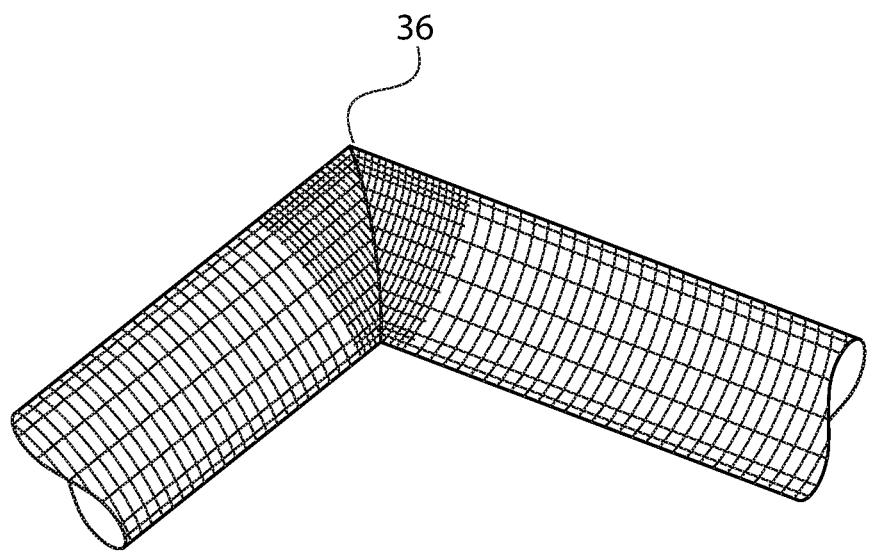
FIG. 5 shows a schematic view of potential filament placement along a miter seam.
Figure 6:
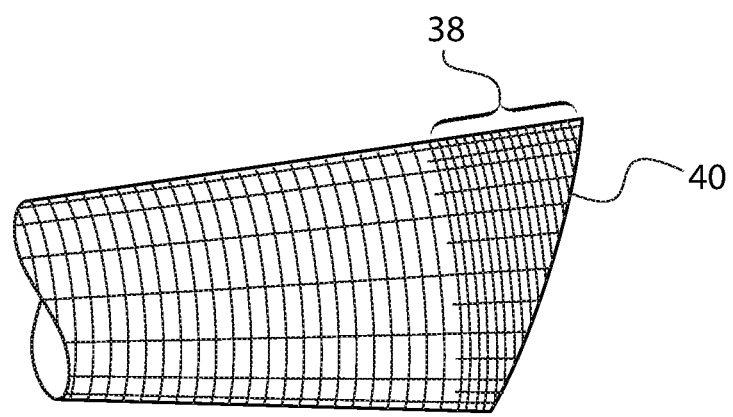
FIG. 6 shows a schematic view of a potential filament placement along a tapered tubular structure.

In the example shown by FIG. 5, it is possible to bunch or stack more filaments at miters or joint locations 36. In the example shown by FIG. 6, it is possible to design larger diameter tubes that are loaded with more filaments. In this example, there is a tapered section 38 of an evacuation slide that is loaded with more filaments at the larger diameter portion 40. These options allow the filament orientations to be varied and customized so that they are strongest in the desired locations, while still maintaining the lightest possible material at other locations.

Additionally, when nonwoven materials are used for sailcloth and kites, the filaments used are unidirectional filaments. Even if multiple substrate layers are used in order to provide filaments of different directions, each substrate itself has filaments that are in the same direction. By contrast, the present inventors have determined that laying multiple directions of filaments on a single panel can add strength to the resulting product.

Figure 7A:
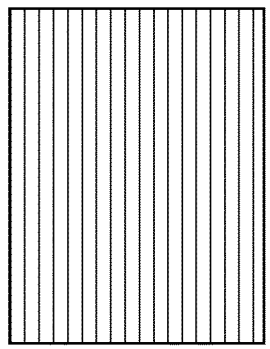
FIG. 7A shows filaments laid at a 0° angle.
Figure 7B:
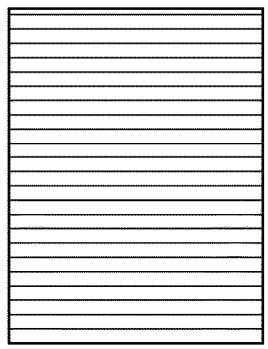
FIG. 7B shows filaments laid at a 90° angle.
Figure 7C:
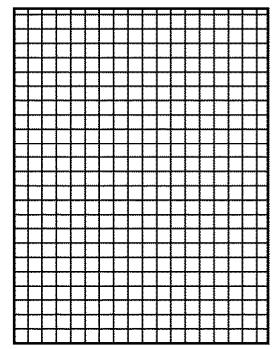
FIG. 7C shows filaments laid at a 0° and 90° angle.
Figure 7D:
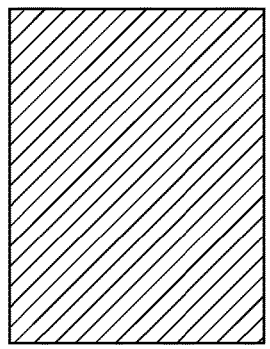
FIG. 7D shows filaments laid at a 45° angle.
Figure 7E:
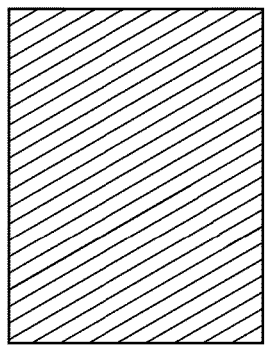
FIG. 7E shows filaments laid at a 30° angle.
Figure 7F:
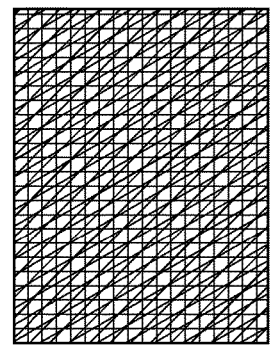
FIG. 7F shows filaments overlaid at a 0°, 90°, 30°, and 45° angle.

For example, each panel can be customized with the particular filament orientations desired. They may be unidirectional or multidirectional or any combination thereof. For a woven cloth, filaments are always at a 90° angle with respect to one another. FIG. 7A illustrates filaments at 0° angle. FIG. 7B illustrates filaments at 90° angle. FIG. 7C illustrates filaments overlaid or interwoven at 0° and 90° angles. This is the only possible result of a woven material. However, with a nonwoven material, other combinations are possible. The filaments may be oriented at 0°, 25°, 30°, 45°, 60°, 90°, or any desired angle. The filaments may be laid in any orientation desired. Just a few examples are illustrated by FIGS. 7D-F. FIG. 7D illustrates filaments at 45° angle. FIG. 7E illustrates filaments at 30° angle. FIG. 7F illustrates a combination of filament substrates overlaid on one another, providing a material having a combination of angled filaments. In this example, angles of 0°, 90°, 30°, and 45° are illustrated, but it should be understood that other combinations are possible and considered within the scope of this disclosure.

Figure 8:
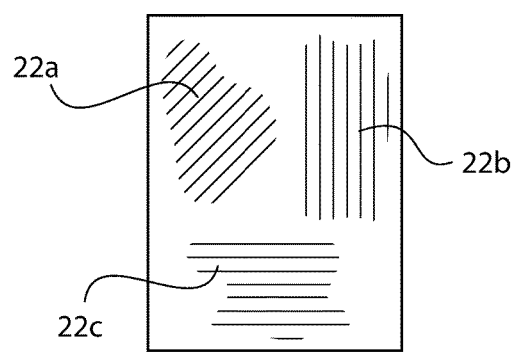
FIG. 8 shows filaments laid at random orientations.

In addition to providing multiple filaments that may be overlaid with respect to one another in order to provide a customized or engineered filament positioning/orientation, it is also possible to lay down single continuous filaments at multiple angles. One example is illustrated by FIG. 8. In this example, there are three different angles of filaments 22a, 22b, 22c provided on a single substrate. This example may be referred to as a random orientation filament.

Figure 9:
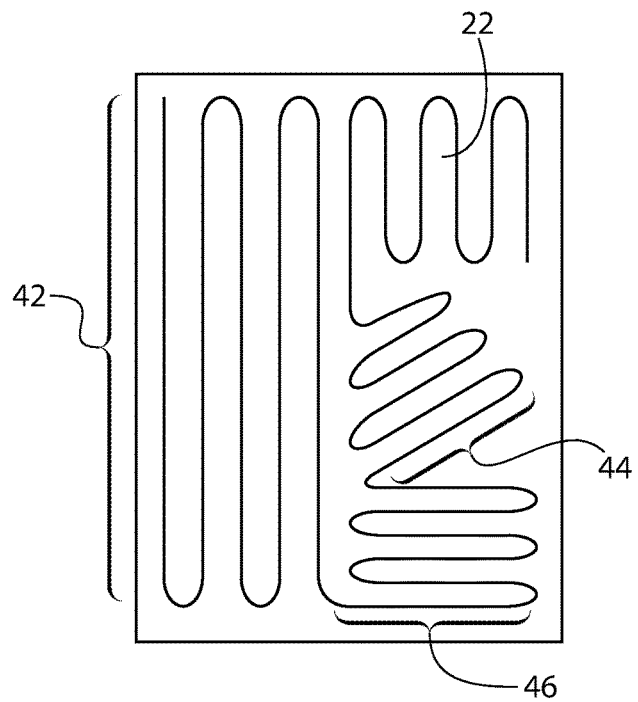
FIG. 9 shows a single strand filament positioned in different orientations, according to load/force.
Figure 10:
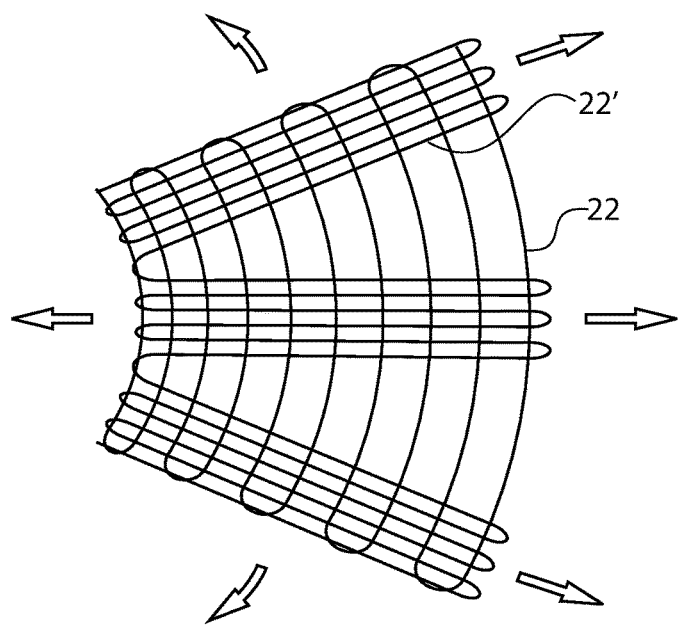
FIG. 10 shows multiple strand filaments positioned according to anticipated high force directions.

In another example, it is possible to provide a single strand of a filament/yarn that is positioned according to expected load/force that will be exhibited on the inflatable product. In FIG. 9, there is illustrated a single strand filament 22 that is wound in a first direction 42, curved into a second direction 44, and then curved into a third direction 46. This is one example only. It is possible for other directions to be provided. It is also possible for additional filament(s)/yarn(s) 22 to be positioned on top of the first filament/yarn 22. One example of this is shown by FIG. 10. In this example, the filament is reinforced in the directions where the highest force is expected.

Figure 11:
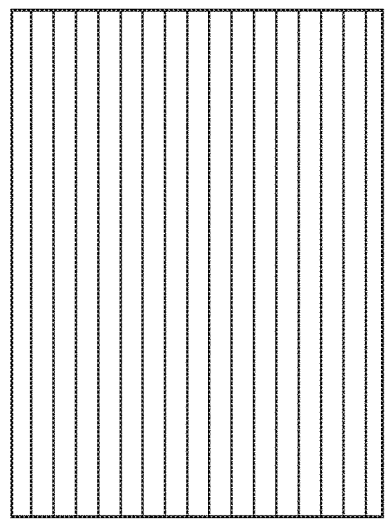
FIG. 11 shows an example of continuous filaments laid on a substrate.
Figure 12:
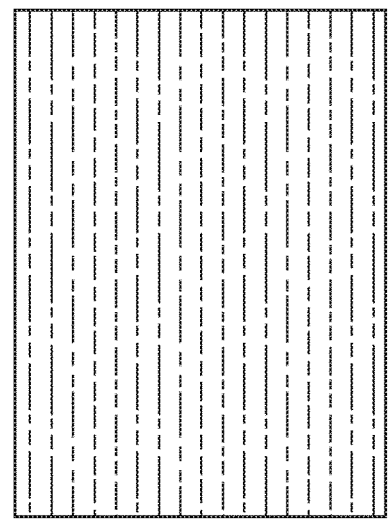
FIG. 12 shows an example of discontinuous filaments laid on a substrate.
Figure 13:
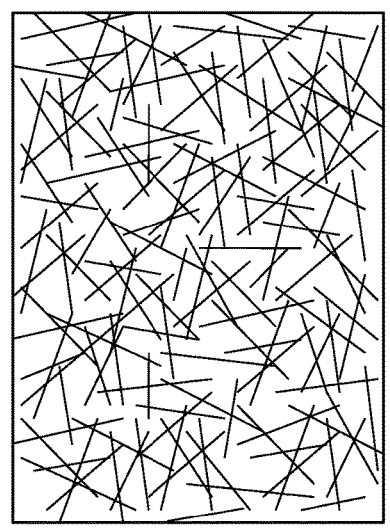
FIG. 13 shows an example of discontinuous random filaments laid on a substrate.

The filaments used may be continuous fibers, as shown by FIG. 11. The filaments used may be discontinuous filaments, as shown by FIG. 12. The filaments used may be discontinuous random filaments, as shown by FIG. 13.

Additionally, or alternatively, it is also possible to use multiple reinforced sheets of monofilament material between polymer layers. In one embodiment, about two to about ten reinforced sheets oriented in different directions may be used as the reinforcing material between the polymer layers. For example, two or more filament sections or substrates may be positioned at 90° to one another in order to help provide a strengthened material. For example, a single filament section or substrate may have filaments running at different angles with respect to one another in order to help provide a strengthened material. Other options are possible and considered within the scope of this disclosure.

Figure 14:
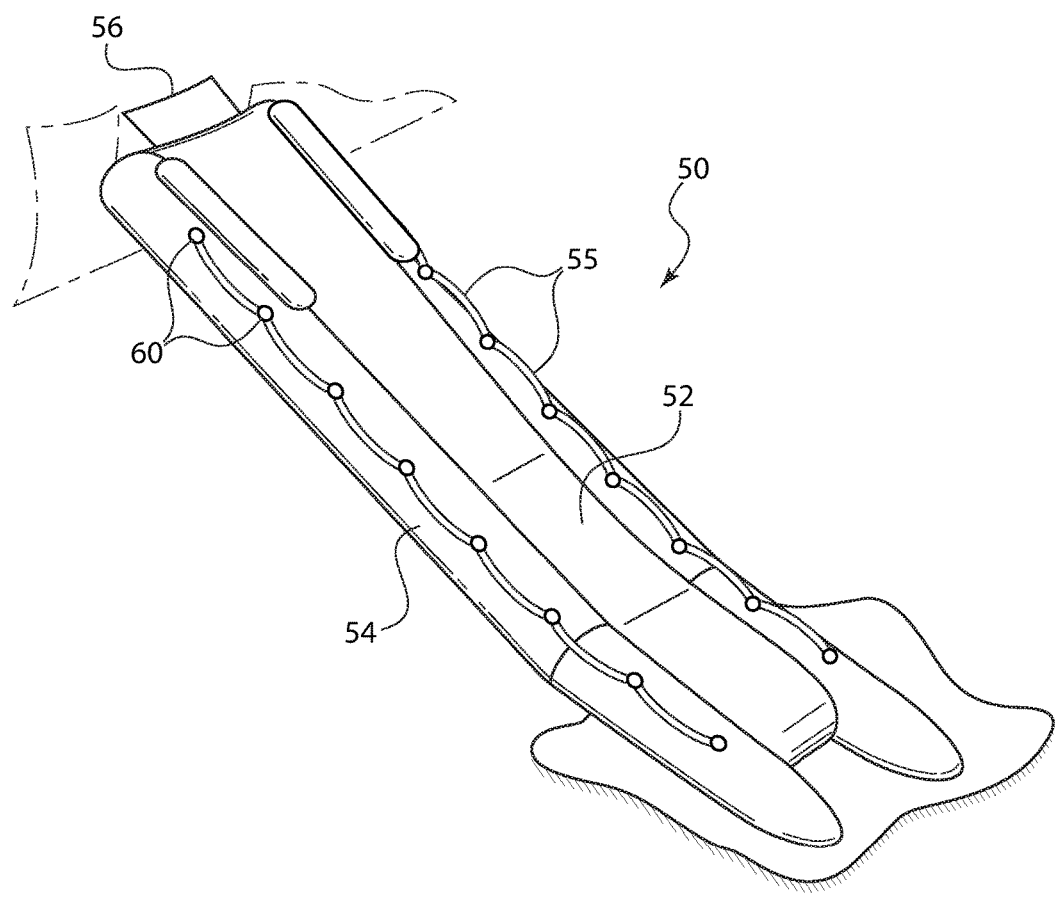
FIG. 14 shows one example of an evacuation slide that may be manufactured using the nonwoven materials described herein.

FIG. 14 illustrates one example of an evacuation slide 50 that may be made using the nonwoven materials of this disclosure. The slide 50 includes a sliding surface 52, air holding tubes 54, a girt 56, handles 55, and accessory patches 60. The nonwoven materials described herein have been directed to manufacture of the air holding tubes 54. It should also be understood that the sliding surface 52 or any other surface may be made of a similar nonwoven material. The sliding surface 52 may be bonded to an air holding tube 54 using the same or similar technology as the way that the ends of an air holding tube 54 material would be bonded to one another. For example, an isocyanate-based adhesive may be used. In other examples, the alternate adhesives described herein may be used. In other examples, various forms of welding technologies may be used.

Changes and modifications, additions and deletions may be made to the structures and methods recited above and shown in the drawings without departing from the scope or spirit of the disclosure or the following claims.

What is claimed is:

1. An inflatable evacuation slide, life raft, life vest, or other life-saving inflatable device, comprising:
   a flexible composite material, comprising
      a substrate of nonwoven material comprising a plurality of filaments;
      an adhesive or primer to bind the filaments; and
      a layer of a gas barrier polymer on one or both surfaces of the substrate of nonwoven material;
   wherein the flexible composite material is a high-strength lightweight material with a tensile strength of at least about 100 pounds per inch and a weight of about 8 ounces per square yard or less,
   wherein the flexible composite material is adhered to itself to form a tubular structure or is adhered to another material.

2. The device of claim 1, wherein the substrate of nonwoven material comprises multiple layers.

3. The device of claim 1, wherein the gas barrier polymer comprises a coating or a film or both.

4. The device of claim 1, wherein the gas barrier polymer comprises polyurethane, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), or any combination thereof.

5. The device of claim 1, wherein the substrate of nonwoven material comprises a non-inflatable part of the device.

6. The device of claim 5, wherein the substrate of nonwoven material comprises floor material of a life raft, an evacuation slide, a girt material of an evacuation slide, or a handle or accessory patch of a life raft or evacuation slide.

7. The device of claim 1, wherein the filaments present a flat surface with minimal crimping or peaks and valleys.

8. The device of claim 1, wherein the filaments are non-continuous in length.

9. The device of claim 8, where in the non-continuous filaments comprise a random orientation filament layout.

10. The device of claim 1, wherein the filaments are continuous in length.

11. The device of claim 1, wherein the filaments comprise one or more single strands positioned according to load exhibited on the structure.

12. The device of claim 11, further comprising one or more additional strands positioned on top of the one or more single strands.

13. The device of claim 1, wherein the filaments are filaments that are unidirectional or multidirectional.

14. The device of claim 1, wherein the filaments comprise a random orientation.

15. The device of claim 1, wherein the substrate of nonwoven material comprises a customized fabric comprising filaments laid in particular directions of the expected stress to be experienced by the device to be manufactured.

16. The device of claim 1, wherein the device comprises a tubular structure comprising a hoop direction and a longitudinal direction, wherein there are more filaments in the hoop direction than in the longitudinal direction.

17. The device of claim 1, wherein the device comprises one or more miter seam locations, wherein there are more filaments at the miter seam location than at other areas of the device.

18. The device of claim 1, wherein the device comprises tubular structures of varying diameters, wherein structures comprising larger diameters comprise more nonwoven filaments than structures comprising smaller diameters.

19. The device of claim 1, wherein the plurality of filaments are formed by spun bonding, wet bonding or dry bonding.

20. The device of claim 1, wherein the nonwoven raw material comprises staple fibers, filament fibers, or a combination thereof.

21. The device of claim 1, wherein the nonwoven material is formed by felting, adhesive bonding, thermal bonding, stitch bonding, needle punching, hydro-entanglement, or spin laying.

22. The device of claim 1, wherein a seam is formed via application of hot air, radio frequency, ultrasonic welding, adhesive bonding, thermal welding, or any combination thereof.

23. The device of claim 1, wherein the gas barrier polymer layer comprises a thickness between about 0.5 mil to about 2 mil.

24. A non-airholding feature on an evacuation slide, life raft, life vest or other life-saving inflatable device, the non-airholding feature comprising:
    a flexible composite material, comprising
        a substrate of nonwoven material comprising a plurality of filaments;
        an adhesive or primer to bind the filaments; and
        a coating or film or both on one or both surfaces of the substrate of nonwoven material;
    wherein the flexible composite material is a high-strength lightweight material with a tensile strength of at least about 100 pounds per inch and a weight of about 8 ounces per square yard or less,
    wherein the flexible composite material is adhered to the emergency device.

25. The feature of claim 24, wherein the non-airholding feature comprises a life raft floor, an evacuation slide surface, a girt, a handle, a patch, or an accessory.

26. The feature of claim 24, wherein the coating or film comprises polyurethane, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), or any combination thereof.

27. A method for manufacturing an inflatable evacuation slide, raft, life vest, or other life-saving inflatable device, comprising:
    providing or obtaining a flexible composite material, comprising a substrate of nonwoven material;
    applying a first layer on at least one surface of the substrate of nonwoven material;
    forming the material into a tubular structure; and
    applying a floor or other accessory to the tubular structure.

* * * * *